United States Patent
Su et al.

(10) Patent No.: US 9,884,945 B2
(45) Date of Patent: Feb. 6, 2018

(54) MELAMINE-POLYOL DISPERSIONS AND USES THEREOF IN MANUFACTURING POLYURETHANE

(75) Inventors: Jackson Su, Shanghai (CN); Jacky Cao, Shanghai (CN); Tadao Yasue, Kanagawa (JP); Mark Cao, Shanghai (CN)

(73) Assignee: Evonik Degussa GmbH, Essen (DE)

(*) Notice: Subject to any disclaimer, the term of this patent is extended or adjusted under 35 U.S.C. 154(b) by 54 days.

(21) Appl. No.: 14/370,173

(22) PCT Filed: Jan. 6, 2012

(86) PCT No.: PCT/CN2012/070015
§ 371 (c)(1),
(2), (4) Date: Jul. 1, 2014

(87) PCT Pub. No.: WO2013/102295
PCT Pub. Date: Jul. 11, 2013

(65) Prior Publication Data
US 2014/0364525 A1      Dec. 11, 2014

(51) Int. Cl.

| | |
|---|---|
| *C08J 9/00* | (2006.01) |
| *C08L 75/04* | (2006.01) |
| *C08G 18/28* | (2006.01) |
| *C08G 18/38* | (2006.01) |
| *C08J 9/02* | (2006.01) |
| *C08K 5/3492* | (2006.01) |
| *C08J 9/14* | (2006.01) |
| *C08G 18/24* | (2006.01) |
| *C08G 18/08* | (2006.01) |
| *C08G 18/32* | (2006.01) |
| *C08G 18/76* | (2006.01) |
| *C08G 18/50* | (2006.01) |
| *C08G 18/22* | (2006.01) |
| *C08G 18/18* | (2006.01) |
| *C08G 101/00* | (2006.01) |

(52) U.S. Cl.
CPC ............. *C08J 9/009* (2013.01); *C08G 18/14* (2013.01); *C08G 18/18* (2013.01); *C08G 18/24* (2013.01); *C08G 18/283* (2013.01); *C08G 18/3206* (2013.01); *C08G 18/3851* (2013.01); *C08G 18/5063* (2013.01); *C08G 18/7621* (2013.01); *C08J 9/0023* (2013.01); *C08J 9/0028* (2013.01); *C08J 9/02* (2013.01); *C08J 9/145* (2013.01); *C08K 5/34922* (2013.01); *C08L 75/04* (2013.01); *C08G 18/22* (2013.01); *C08G 18/282* (2013.01); *C08G 2101/00* (2013.01); *C08G 2101/0008* (2013.01); *C08J 2201/022* (2013.01); *C08J 2205/06* (2013.01); *C08J 2205/08* (2013.01); *C08J 2375/08* (2013.01)

(58) Field of Classification Search
CPC .............. C08G 18/282; C08G 18/2825; C08K 5/34922
See application file for complete search history.

(56) References Cited

U.S. PATENT DOCUMENTS

| | | | |
|---|---|---|---|
| 4,293,657 A | 10/1981 | Nissen et al. | |
| 4,892,893 A | 1/1990 | Grace et al. | |
| 5,125,952 A | 6/1992 | Moore et al. | |
| 5,177,118 A * | 1/1993 | Dueber | ............... C08G 18/3234 521/109.1 |
| 5,885,479 A | 3/1999 | Chakrabarti et al. | |
| 2007/0238800 A1* | 10/2007 | Neal | ..................... C08G 18/283 521/174 |
| 2010/0267304 A1* | 10/2010 | Fowler | ..................... B32B 5/18 442/224 |

FOREIGN PATENT DOCUMENTS

| | | |
|---|---|---|
| CN | 1053073 A | 7/1991 |
| CN | 1063112 A | 7/1992 |
| CN | 1169068 A | 12/1997 |
| CN | 1296503 A | 4/1999 |
| CN | 101130928 A | 2/2008 |
| JP | 04117416 | 4/1992 |
| JP | H06192558 A | 7/1994 |
| JP | 2001170715 A | 6/2001 |
| JP | 2003128743 A | 5/2003 |
| WO | WO 2009029378 A1 * | 3/2009 ......... C08G 18/4837 |

OTHER PUBLICATIONS

PCT Search Report dated Oct. 4, 2012 corresponding to PCT Application No. PCT/CN2012/070015 filed Jan. 6, 2012 (4 pages).
PCT Written Opinion dated Oct. 4, 2012 corresponding to PCT Application No. PCT/CN2012/070015 filed Jan. 6, 2012 (4 pages).

* cited by examiner

*Primary Examiner* — Melissa A Rioja
(74) *Attorney, Agent, or Firm* — Andrew H. Chung; Linda S. Li; Jason S. Ngui

(57) ABSTRACT

Melamine-polyol dispersions comprising ethoxylated alcohols of specific structures are disclosed. Such dispersions maintain their stability under stationary conditions for at least 24 hours and are useful in the manufacturing of polyurethane foams. The resulted polyurethane foams display more evenly-distributed flame retardant properties.

21 Claims, 1 Drawing Sheet

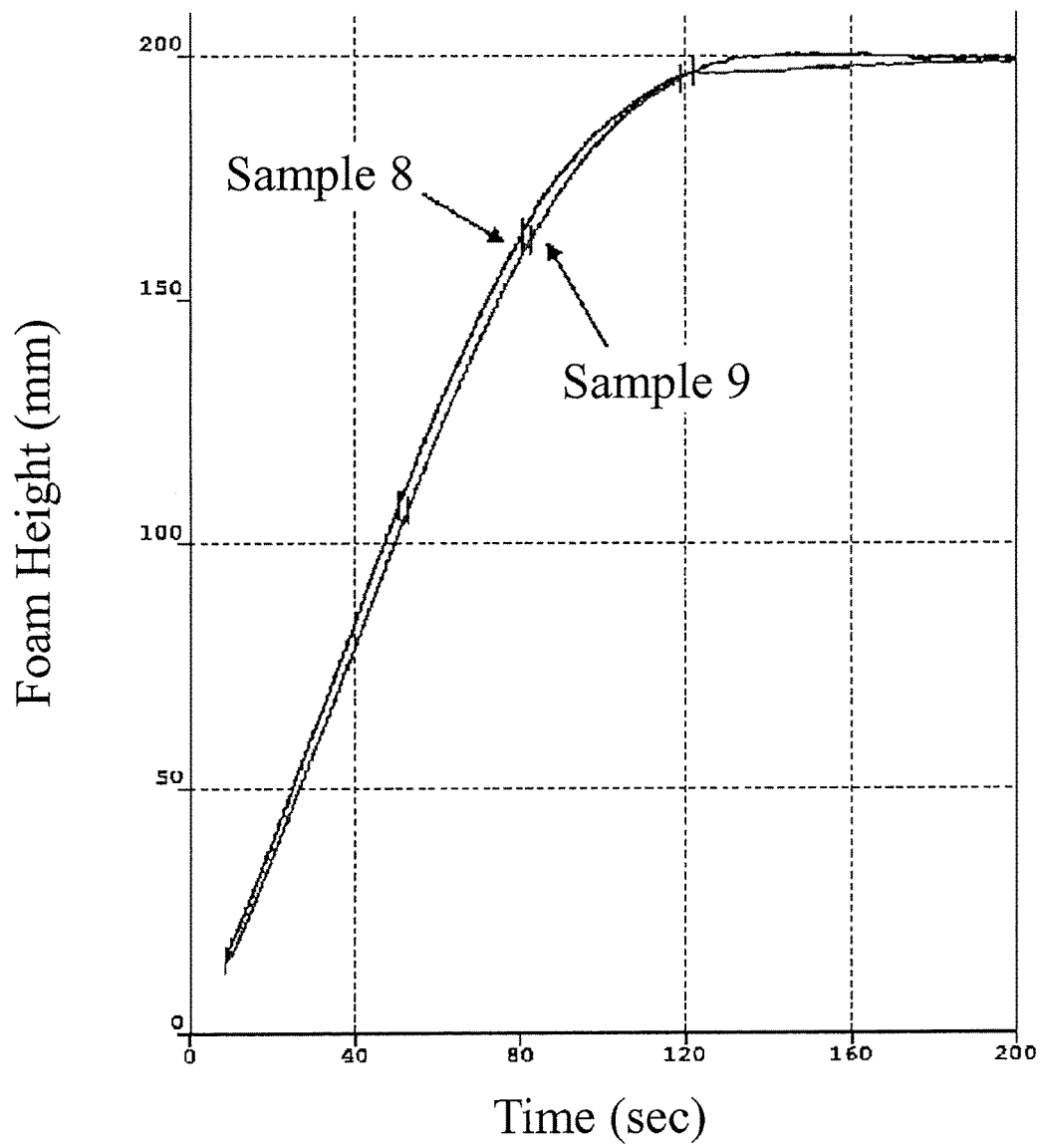

MELAMINE-POLYOL DISPERSIONS AND USES THEREOF IN MANUFACTURING POLYURETHANE

FIELD OF THE INVENTION

This disclosure relates to stable melamine-polyol dispersions, a method of preparing such dispersions, their uses in manufacturing polyurethane foams, and articles made therefrom.

BACKGROUND OF THE INVENTION

Flexible polyurethane foams are widely used in products such as mattresses and seating, where safety considerations require that they exhibit effective fire retardant properties. Flexible polyurethane foams may be made to possess satisfactory resistance to ignition and/or flame propagation by the addition of one or more flame retardant substances.

Melamine is a flame retardant commonly employed in the preparation of polyurethane foams. Melamine is generally dispersed in a suspending liquid before foaming for the ease of handling. Suitable suspending liquids exhibit low solvency for and are chemically inert to melamine. A common suspending liquid is high molecular weight liquid organic polyols.

U.S. Pat. No. 4,293,657 teaches the use of melamine dispersions in polyol wherein the melamine has a particle size of less than 10 μm and is produced by crushing in situ in the polyol at high localized energy densities. A dispersion stabilizer is also a necessary ingredient. In addition, it discloses that the polyols may be partially replaced by monofunctional primary and/or secondary hydroxyl group-compounds having molecular weights of 200 to 16,000.

U.S. Pat. No. 5,125,952 discloses a storage-stable concentrated liquid dispersion of melamine that contains fine melamine particles, admixed with a chemically inert suspending liquid and a chemically inert thickening agent. Effective thickening agents include xanthan gums, carrageenans, polyacrylamide, chemically treated cellulose, and clays.

U.S. Pat. No. 4,892,893 discloses the preparation of flame retardant flexible polyurethane foams incorporating substantially uncrushed melamine in an amount ranging from about 5 weight percent to about 25 weight percent of the weight of the foam.

The disclosure of the previously identified patents is hereby incorporated by reference.

SUMMARY OF THE INVENTION

Manufacturing of flame retardant polyurethane foams often employs melamine-polyol dispersions, which are prepared through blending melamine particles into polyol liquids. Uniform melamine-polyol dispersions of manufacturing quantity may take between 8 to 10 hours of mixing to form and once agitation stops, layer separation in such dispersions may occur in less than 24 hours, sometimes within 6 hours. The long mixing time consumes energy and the small window of stability presents processing challenges. Non-uniform melamine-polyol dispersions may also result in polyurethane foams of unevenly-distributed melamine particles and non-uniform flame retardant properties.

The invention solves the above problems by providing melamine-polyol dispersion compositions that are stable for at least 24 hours, in some cases for more than 48 hours among many other objects and benefits.

Another object of this invention is to provide melamine-polyol dispersion compositions that may be uniformly blended under manufacturing conditions within a time period of less than eight hours, typically less than two hours.

Yet another object of this invention is to provide melamine-polyol dispersion compositions that are substantially free of thickening agents and/or stabilizers containing salts.

A further object is to provide a method preparing the melamine-polyol dispersions of the invention.

A further object of this invention is to provide a formulation and a method for making flame retardant polyurethane foams with evenly-distributed melamine particles and uniform flame retardant properties.

In one aspect, this disclosure provides a melamine-polyol dispersion comprising:
a) at least one polyol,
b) melamine,
c) at least one ethoxylated alcohol of the following formula:

RO(CH$_2$CH$_2$O)$_n$H, wherein R is C1-C31 linear alkyl,
n is an integer equal to or greater than 18; and
wherein the at least one ethoxylated alcohol having a hydrophilic-lipophilic balance (HLB) value of equal to or greater than about 15.7.

In another aspect, this invention discloses a melamine-polyol dispersion comprising:
a) at least one polyol,
b) about 30 pphp melamine,
c) at least one ethoxylated alcohol of the following formula:

RO(CH$_2$CH$_2$O)$_n$H,

Wherein R is a C13 linear alkyl and n is 40.

In yet another aspect, this invention provides a method for making the above melamine-polyol dispersion, such method includes the following steps:
a) combining at least one polyol, about greater than 0 to about 80 pphp melamine and at least one ethoxylated alcohol of the following formula:

RO(CH$_2$CH$_2$O)$_n$H, wherein R is C1-C31 linear alkyl,
n is an integer equal to or greater than 18 and the at least one ethoxylated alcohol is in an aqueous solution and comprises an amount effective for keeping said dispersion stable for at least 24 hours, wherein the at least one ethoxylated alcohol having a hydrophilic-lipophilic balance (HLB) value of equal to or greater than about 15.7; and
b) mixing the mixture of a) until a stable dispersion is formed.

Another aspect of the invention relates to a polyurethane foam formulation comprising the melamine-polyol dispersion disclosed above, along with at least one polyisocyanate at an isocyanate Index from about 80 to about 150, at least one blowing agent, at least one amine catalyst, at least one metal catalyst and at least one silicone surfactant.

In a further aspect, this invention discloses a polyurethane foam made with the previously disclosed foam formulation.

In yet a further aspect, this invention provides a method for preparing a polyurethane foam comprising the following steps:

a) forming a premix comprising the above-disclosed melamine-polyol dispersion, at least one blowing agent, at least one amine catalyst, at least one metal catalyst and at least one silicone surfactant; and b) contacting the premix with at least one polyisocyanate at an Isocyanate Index from about 80 to about 150.

DESCRIPTION OF DRAWINGS

FIG. 1 compares the foam-rising profile of sample 8 and sample 9.

DETAILED DESCRIPTION OF THE INVENTION

The invention relates to a melamine-polyol dispersion comprising polyol, melamine and at least one ethoxylated alcohol, shown below as formula A. The dispersion may remain stable without agitation for at least 24 hours, in some cases more than 48 hours. Melamine particles in polyurethane foams made with such a dispersion are more evenly distributed, resulting in more uniform flame retardant properties.

Ethoxylated Alcohol

The at least one ethoxylated alcohol of the present invention has the following formula A:

$$RO(CH_2CH_2O)_nH, \quad A$$

in which R is C1-C31 linear alkyl, inclusive; n is an integer equal to or greater than 18; and the compound has a hydrophilic-lipophilic balance (HLB) value of equal to or greater than about 15.7.

The term "alkyl" used herein refers to aliphatic hydrocarbon radicals containing only saturated carbon-carbon bonds. Alkyl groups without branches and unsaturated carbon-carbon bonds are suitable for the present invention.

The number "n" of ethoxy units in formula A may be any integer equal to or greater than 18. Non-limiting representative examples include n=18, n=20, n=40, n=50, n=60 or n=70.

The term "hydrophilic-lipophilic balance (HLB) value" as used herein is a measure of the degree to which a compound is hydrophilic or lipophilic. HLB is calculated using molecular mass of different regions of a molecule, as described by Griffin:

$$HLB=20 \times Mh/M$$

Wherein Mh is the molecular mass of the hydrophilic portion of the molecule, and M is the molecular mass of the entire molecule, giving a result on an arbitrary scale of 0 to 20.

An HLB value of 0 corresponds to a completely hydrophobic molecule, and a value of 20 corresponds to a completely hydrophilic molecule.

As an example, the HLB value of $C_{13}H_{27}(CH_2CH_2O)_{40}H$ is calculated as the following:

$$HLB=20 \times Mh/M=20 \times 1761/1944=18.1$$

Wherein Mh is the molecular mass of the hydrophilic part $(CH_2CH_2O)_{40}H$ and M is the molecular mass of the entire molecule.

Examples of suitable HLB value for the present invention include, but not limited to HLB value equal to or greater than 15.7, 17, 18 and 19.

Commercial ethoxylated alcohol products suitable for the present invention include, but not limited to EMULMIN CC200 (Sanyo Chemical Industries, Ltd), YDY-234-103// X300 (Air Products and Chemicals) and Newcol 1860 (Nippon Nyukazai Co., Ltd). These products may comprise a mixture of ethoxylated alcohol with variable R groups and n values, but at least one of the ethoxylated alcohol in above products falls within the scope of formula A.

Commercial ethoxylated alcohol products are generally offered in a solvent such as water. For the purpose of this invention, an aqueous solution of ethoxylated alcohol is employed in preparing the melamine-polyol dispersion. However, the amount of ethoxylated alcohol in the melamine-polyol dispersion as claimed refers to the pure, un-dissolved amount of ethoxylated alcohol. For example, if 2 grams of 70 wt % aqueous ethoxylated alcohol are combined with 100 grams of polyol, the amount of ethoxylated alcohol in the mixture is:

$$(2 \times 0.7/100) \times 100 = 1.4 \text{ pphp (parts by weight per hundred weight parts of the polyol)}$$

Melamine-polyol Dispersion

Commercially available melamine products of various particle sizes and size distributions may be used in the invention. No crushing or other special treatments of melamine particles is required before preparing the melamine-polyol dispersions herein.

About greater than 0 to about 80 pphp, optionally about 5 to about 80 pphp, or about 30 to about 80 pphp melamine may be used in the invention.

Polyol of the invention may be different or the same as polyols in polyurethane foam formulations. It may comprise polyether polyol, polyester polyol or polymer polyol and will be described later in more details.

During lab testing, about 100 g polyol, about greater than zero up to about 80 g melamine and an effective amount of ethoxylated alcohol solution are combined together and mixed until a uniform dispersion is formed. Any conventional mixing method, such as mechanical stirring or shaking may be employed. The order of adding melamine and ethoxylated alcohol into polyol does not impact the formation of the dispersion.

The melamine-polyol dispersion is placed still at room temperature (20~25° C.) and its appearance is closely observed. A stable dispersion means a dispersion without appreciable settling of solids from the dispersion and without appreciable layer separation to a naked-eye.

An "effective" amount of ethoxylated alcohol is an amount needed to keep the melamine-polyol dispersion stable for at least 24 hours, in some cases more than 48 hours. A melamine-polyol dispersion may comprise at least about 0.5 pphp, at least about 0.7 pphp or at least about 1.0 pphp pure, un-dissolved ethoxylated alcohol.

Typical manufacturing conditions involve contacting polyol, melamine and ethoxylated alcohol solution of formula A in a blending tank with a capacity of 20 $m^3$ and mixing with a 30 watt mechanical stirrer at about 1800 revolutions per minute (rpm).

The melamine-polyol dispersion of the invention may further comprise up to 400 pphp of fillers including $CaCO_3$, $BaSO_4$ and any combination thereof and still remain stable for at least 24 hours.

Other liquid flame retardants, including, but not limited to halogenated flame retardants, non-halogenated flame retardants and any combination thereof may be added into the melamine-polyol dispersion without affecting its stability.

Thickening agents have been reported to stabilize melamine-polyol dispersions. Reported thickening agents include xanthan gums, carrageenans, polyacrylamide, chemically treated cellulose, clays and alike. The melamine-polyol dispersion of the present disclosure does not require above thickening agents to remain stable. Or in other words, the melamine-polyol dispersion of the present disclosure may be substantially free of above thickening agents. By "substantially free", it is meant that the melamine-polyol dispersion has about zero to about less than 0.5 pphp of the above thickening agents.

U.S. Pat. No. 4,293,657 reports the necessary inclusion of stabilizers in its stable melamine-polyoxyalkylene polyether polyol dispersions. Those stabilizers consist of silicic acids and silicates; salts of perfluorinated alkyl carboxylic acids, alkyl sulfonic acids and perfluorinated alkylsulfonic acids; polyperfluoroether polyols and salts of fatty alcohol sulfates. The melamine-polyol dispersion of the present disclosure does not require above stabilizers to remain stable. Or in other words, the melamine-polyol dispersion of the present disclosure may be substantially free of above stabilizers. By "substantially free", it is meant that the melamine-polyol dispersion has about zero to about less than 0.5 pphp of the above stabilizers.

Preparation of Foams

Foams of any of the various types known in the polyurethane art may be made using the methods of this invention, using typical polyurethane formulations to which have been added the melamine-polyol dispersion according to the invention. Typical components of polyurethane formulation include at least one polyol, at least one blowing agent such as water, at least one polyisocyanate, at least one amine catalyst, at least one metal catalyst and at least one silicone surfactant. Other additives may be included depending on the types and applications of the polyurethane. For example, flexible polyurethane foams will typically comprise the components shown in Table 1, in the amounts indicated. The components shown in Table 1 will be discussed in detail later.

TABLE 1

Polyurethane Components

| Component | Parts by Weight |
| --- | --- |
| Base Polyol | 20-100 |
| Polymer polyol | 0-80 |
| Water | 0-10 |
| Melamine | 0-80 |
| Silicone surfactant | 0-10 |
| Blowing agent | 0-40 |
| Crosslinker | 0-2 |
| Amine catalyst | 0-1.0 |
| Metal catalyst | 0-1.0 |
| Polyisocyanate | To provide NCO index = 80-150 |

The amount of polyisocyanate used in polyurethane formulations according to the invention is not limited, but it will typically be within those ranges known to those of skill in the art. An exemplary range is given in the above table, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula:

NCO index=[NCO/(OH+NH)]×100

Flexible foams typically use polymer polyols as part of the overall polyol content in the foam composition, along with base polyols of about 2000-5000 weight average molecular weight and hydroxyl number of about 14-100. Base polyols and polymer polyols will be described in detail later herein.

In some embodiments of the invention, the catalyst, the blowing agent, the crosslinker, the surfactant and optionally one or more other additives commonly used in polyurethane formation may be combined into the melamine-polyol dispersion. Such mixtures may subsequently be contacted with an organic isocyanate to form a polyurethane foam, again optionally in the presence of other additives known in the art.

In addition to making flexible foams, the invention may also be used to prepare semi-flexible foams, such as are commonly utilized for many applications in the automotive industry (e.g., instrument panels, headliners and interior trims).

Although specific exemplary types of polyurethane foams are discussed above and elsewhere herein, it is to be understood that polyurethane foams of any type may be prepared according to the invention.

Catalysts

The polyurethane formulation disclosed herein can contain any of the catalysts, and combination of catalysts, known or used for the production of polyurethane foams. Examples of useful catalysts include sodium hydroxide, sodium acetate, tertiary amines or materials which generate tertiary amines such as trimethylamine, triethylene diamine, bis-(dimethylaminoethyl)ether, bis-(dimethyl-(amino-N-propyl)-methylamine, N-methyl morpholine, N,N-dimethyl cyclohexylamine, and N,N-dimethyl aminoethanol. Also applicable are metal compounds such as tin alkyl carboxylates, dibutyl tin diacetate, dibutyl tin dioctoate, dibutyl tin dilaurate and stannous octoate. Exemplary catalysts are DABCO® 33LV (Air Products and Chemicals) and DABCO® T-9 (Air Products and Chemicals).

Many other kinds of catalysts can be substituted for those listed above, if desired. Typically, the loading of catalyst(s) for making a foam according to the invention will be in the range of from greater than 0 to about 2 pphp, more typically from greater than 0 to about 1 pphp, and most typically from greater than 0 to about 0.5 pphp. However, any effective amount may be used. The term "pphp" means weight parts per hundred weight parts of the polyol.

Blowing Agents

Polyurethane foam production may be aided by the inclusion of a blowing agent to produce voids in the polyurethane matrix during polymerization. Any blowing agent known in the art may be used. Suitable blowing agents include compounds with low boiling points which are vaporized during the exothermic polymerization reaction. Such blowing agents are generally inert and therefore do not decompose or react during the polymerization reaction. Examples of inert blowing agents include, but are not limited to, methylene chloride, carbon dioxide, chlorofluorocarbons, hydrogenated fluorocarbons, hydrogenated chlorofluorocarbons, acetone, and low-boiling hydrocarbons such as cyclopentane, isopentane, n-pentane, and their mixtures. Other suitable blowing agents include compounds, for example water, that react with isocyanate compounds to produce a gas.

Organic Isocyanates

Suitable organic isocyanate compounds include, but are not limited to, hexamethylene diisocyanate (HDI), phenylene diisocyanate (PDI), toluene diisocyanate (TDI), and 4,4'-diphenylmethane diisocyanate (MDI). In one aspect of the invention, 2,4-TDI, 2,6-TDI, or any mixture thereof is used to produce polyurethane foams. Other suitable isocyanate compounds are diisocyanate mixtures known commercially as "crude MDI." One example is marketed by Dow Chemical Company under the name PAPI, and contains about 60% of 4,4'-diphenylmethane diisocyanate along with other isomeric and analogous higher polyisocyanates.

Also suitable are "prepolymers" of these isocyanate compounds, comprising a partially pre-reacted mixture of a polyisocyanate and a polyether or polyester polyol to convert one or more hydroxyls on the polyester polyol to substituted carbamate groups. Suitable prepolymers derived from polyether and polyester polyols are well known in the art.

Polyol Component

Polyurethanes are produced by the reaction of organic isocyanates with the hydroxyl groups in a polyol, typically a mixture of polyols. The polyol component of the reaction mixture includes at least a main, or "base" polyol. Base polyols suitable for use in the invention include, as non-limiting examples, polyether and polyester polyols. The polyalkylene ether polyol includes the poly(alkyleneoxide) polymers such as poly(ethyleneoxide) and poly(propyleneoxide) polymers and copolymers with terminal hydroxyl groups derived from polyhydric compounds, including diols and triols, These include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, and sugars such as sucrose and like low molecular weight polyols.

Amine polyether polyols can be used in the present invention. These can be prepared when an amine such as, for example, ethylenediamine, diethylenetriamine, tolylenediamine, diphenylmethanediamine, or triethanolamine is reacted with ethylene oxide or propylene oxide.

In another aspect of the present invention, a single high molecular weight polyether polyol, or a mixture of high molecular weight polyether polyols, such as mixtures of different multifunctional materials and/or different molecular weight or different chemical composition materials can be used.

In yet another aspect of the present invention, polyester polyols can be used, including those produced when a dicarboxylic acid is reacted with an excess of a diol. Non-limiting examples include adipic acid or phthalic acid or phthalic anhydride reacting with ethylene glycol or butanediol. Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention.

In addition to the base polyols described above, or instead of them, materials commonly referred to as "polymer polyols" may be included in a polyol component for use according to the invention. Polymer polyols may be used in polyurethane foams to increase the resistance of the foam to deformation, for example to improve the load-bearing properties of the foam. Depending upon the load-bearing requirements for the polyurethane foam, polymer polyols may comprise from 0 to about 80 percent by weight of the total polyol content. Examples of polymer polyols include, but are not limited to, graft polyols and polyurea modified polyols, both of which are known in the art and are commercially available.

Other Optional Components

A variety of other ingredients may be included in the formulations for making foams according to the invention. Examples of optional components include, but are not limited to, cell stabilizers, crosslinking agents, chain extenders, pigments, fillers and combinations of any of these.

Practice of this invention may allow polyurethane manufacturers to realize one or more advantages. These may include a) reduced time and energy required to form melamine-polyol dispersions that may be readily used in polyurethane production; b) stable melamine-polyol dispersions that allow more time for processing other components for making polyurethanes; c) only small adjustment of polyurethane formulation is needed; in the case that aqueous solution of ethoxylated alcohol is used, the water content in original polyurethane formulation may need to be reduced accordingly; d) polyurethane foam produced with this invention demonstrates more uniform fire retardant qualities due to more evenly-distributed melamine particles throughout the foam; e) other physical properties of the produced foam are not adversely affected by employing this invention.

The invention is further described in the context of the following Examples, which are presented by way of illustration, not of limitation.

EXAMPLES

Example 1

Preparation of Melamine-Polyol Dispersions and Determination of their Stability

Melamine-polyol dispersions were prepared using the following procedure at room temperature (20-25° C.). To a beaker of 1000 mL was added 100 g polyether polyol, from about 0 to about 80 g of melamine and various amounts of aqueous solutions of 70 wt. % ethoxylated alcohols being tested. The mixture was then stirred using a mechanical stirrer with a diameter of 90 mm at 1150 rpm for 300 seconds or until a uniform dispersion was formed. The dispersion was then transferred to a glass vial of 20 mL and the vial was placed still for up to 48 hours. The vial was visually checked periodically for any solid settling out the mixture or any clear layer formed at the top of the dispersion or any layer separation in the dispersion. If any of the above phenomena were observed, the dispersion would be recorded as unstable; otherwise, the dispersion was recorded as stable.

Example 2

Stability Test of Melamine-Polyol Dispersions Made with Various Compounds

Ethoxylated alcohols with different alkyl groups, ethoxy units and therefore distinct HLB values were employed to prepare melamine-polyol dispersions according to the procedure of Example 1. Their effects on the stability of the formed dispersion were compared following the visual check method of Example 1 and the results are listed in Table 2. All ethoxylated alcohols tested fit the following formula:

in which R is a linear alkyl and n is an integer greater than 0.

TABLE 2

Stability of Melamine-Polyol Dispersions with Ethoxylated Alcohols

| Sample | Ethoxylated Alcohol | R | Avg. n | HLB | Amount (pphp) | Melamine-polyol Dispersion Stable after 24 hours |
|---|---|---|---|---|---|---|
| 1 | Tomadol ® 91-8 | C9-C11 | 8.3 | 13.9 | 2.0 | no |
| 2 | Tomadol ® 25-12 | C12-C15 | 11.9 | 14.4 | 2.0 | no |
| 3 | Tomadol ® 45-13 | C14-C15 | 12.9 | 14.4 | 2.0 | no |
| 4 | Newcol ® 1545 | C13-C15 | 18-20 | 13.8 | 2.0 | no |
| 5 | Compound 1 | C16 | 18-20 | 15.7 | 2.0 | yes |
| 6 | Compound 2 | C11-C13 | 40 | 17.8 | 2.0 | yes |
| 7 | Compound 3 | C18 | 60 | 18.1 | 2.0 | yes |

Samples 1-7 all contained 80 pphp melamine. The "amount" is defined as the amount of the aqueous solutions of 70 wt. % ethoxylated alcohols used. The amount of pure, un-dissolved ethoxylated alcohol employed in each sample thus was 1.4 pphp.

Tomadol® 91-8, Tomadol® 25-12 and Tomadol® 45-13 were from Air Products and Chemicals, Inc. and Newcol® 1545 was from Nippon Nyukazai Co. Ltd. Compound 1-3 were lab samples of the specified structures.

Samples 1-7 may contain mixtures of compounds with structures falling within the scope of the specified "R" and "Avg. n". "R" designates the range of carbon numbers of the linear alkyl group and "Avg. n" is the range or average number of ethoxy units in each sample.

A melamine-polyol dispersion without any ethoxylated alcohol became unstable in less than 6 hours. Other compounds, such as PEG2000 from Sanyo chemical industry industries, Ltd., with a formula of $HO—(CH_2CH_2O)_4H$ and Sannix GEP 2800 from Sanyo chemical industries, Ltd., which is a glycerin initiated polyether polyol with a EO/PO ratio of 1:1 and a molecular weight of 2800, cannot stabilize melamine-polyol dispersion when combined thereinto.

This Example illustrates that only ethoxylated alcohols satisfying certain structural requirements may stabilize melamine-polyol dispersions for at least 24 hours.

Example 3

Effective Amount Determination of Ethoxylated Alcohols

This Example illustrates how the amount of ethoxylated alcohols affects the stability of melamine-polyol dispersions. Melamine-polyol dispersions containing 80 pphp melamine in polyether polyols were prepared according to the procedure of Example 1 with varying amount of compound 2. Compound 2 was used in the form of an aqueous solution of 70 wt. % of ethoxylated alcohols of specific structures as described in Table 2. Results are listed in Table 3 below.

TABLE 3

Effect of Compound 2 Amount on the Stability of the Melamine-Polyol Dispersions

| Amount of Pure Compound 2 (pphp) | Amount of 70 wt. % Aqueous Solutions of Compound 2 (pphp) | Melamine-polyol Dispersion Stable after 24 hours | Melamine-polyol Dispersion Stable after 48 hours |
|---|---|---|---|
| 0.42 | 0.6 | No | No |
| 0.49 | 0.7 | Yes | Yes |
| 0.56 | 0.8 | Yes | Yes |
| 0.7 | 1.0 | Yes | Yes |
| 1.05 | 1.5 | Yes | Yes |

Example 4

Flame-Retardant Properties of Polyurethane Foams Made with and without the Inventive Melamine Polyol Dispersions Polyurethane foams were produced using lab-scale box mold method and foaming machine method with the formulations listed in Table 4.

TABLE 4

Polyurethane Formulation

| Components | Sample 8 | Sample 9 | Sample 10 | Sample 11 |
|---|---|---|---|---|
| VORANOL ® 3022J | 100 | 100 | 100 | 100 |
| Melamine | 25 | 25 | 30 | 30 |
| Antiblaze ® BK69 | 15 | 15 | 15 | 15 |
| Dabco ® DC 5950 | 1.20 | 1.20 | — | — |
| Dabco ® DC5990 | — | — | 0.80 | 0.80 |
| Dabco ® AS-45 | 0.50 | 0.50 | — | — |
| Dabco ® CS90 | 0.20 | 0.20 | 0.10 | 0.10 |
| Compound 2 | — | 2.00 | — | 2.00 |
| DEOA | 0.25 | 0.25 | 0.20 | 0.20 |
| Water | 3.50 | 2.90 | 4.20 | 3.60 |
| Dabco ® T9 | 0.45 | 0.45 | 0.31 | 0.31 |
| Methylene Chloride | 3.50 | 3.50 | 2.00 | 2.00 |
| TDI Index | 108 | 108 | 110 | 110 |

In the above formulations, other than TDI, the rest components were listed as the weight parts per hundred weight parts of the polyol (pphp).

Of the above components, VORANOL® 3022J (Dow chemicals, Inc) was a polyether polyol with a hydroxyl number of 56. Melamine was purchased from Sichuan Hongjie chemicals. Antiblaze® BK69 (Albemarle chemicals, Inc) was a liquid flame retardant. All Dabco® products were from Air Products and chemicals, Inc, among which Dabco® DC 5950 and Dabco® DC5990 were both silicone surfactants, Dabco® AS45 was an anti-oxidant, Dabco® CS90 was an amine catalyst and Dabco® T-9 was a tin catalyst. DEOA (diethanol amine) was a crosslinker from Dow Chemicals. Methylene Chloride (Zibo Fengchang Chemicals) was a physical blowing agent. TDI (BASF Chemicals) was an 80/20 2,4/2,6 isomer blend of toluene diisocyanate. Compound 2 was used in the form of an aqueous solution of 70 wt. % of ethoxylated alcohols of specific structures as described in Table 2.

Sample 8 and 9 were prepared using lab-scale box foam method. In a tank of 10 L was added 2500 g of polyol, 625 g of melamine, 50 g of compound 2 in the case of sample 9 and no compound 2 in the case of sample 8, and the mixture was blended for 5 min using a mechanic stirrer rotating at 1600 rpm; the next step was to add 375 g of liquid flame retardant, 5 g of amine catalyst, 30 g of silicone surfactant, 87.5 g of water and 12.5 g of antioxidant into the tank and further blend for 1 min. The tin catalyst (11.25 g) was then added and mixed for an additional 10 sec followed by the simultaneous addition of blowing agent (87.5 g) and TDI (1168 g) and the mixture was blended for 6 sec. The mixture was then poured into a open box mold (60 cm×60 cm×60 cm) with ambient condition (no heat). After 60 min of reaction time in the box mold, the foam was demolded, and the flame retardant properties and other physical properties were measured 23 hrs afterwards.

Sample 10 and 11 were prepared using conventional foaming machine method that is well-known to person skilled in the art. A Hanneke high pressure foaming machine of the Maxfoam line (Hennecke) was used. Polyol, melamine, compound 2 of the specified weight percentages in the case of sample 11 and no compound 2 in the case of sample 10 were pre-blended in a 20 m3 tank at a stirring speed of 1800 rpm. For sample 10, the blending time was 10 hr and for sample 11, the blending time was 2 hr. For both samples 10 and 11, after pre-blending was completed, the polyol-melamine dispersions were sit still for 1 hr before the dispersions were transferred into the Henneke high pressure foaming machine to be combined with other components for making polyurethane foams.

Because ethoxylated alcohols in above samples 8-11 were used in the form of aqueous solutions, polyurethane formulations employing those required less water. The amount of water needed may be calculated by subtracting the water in the aqueous ethoxylated alcohol solutions from the amount of water required in polyurethane formulations containing no aqueous ethoxylated alcohol solutions.

The flame retardant properties of samples 8-11 were measured using Great Britain Standard Method BS5852 crib 5. The results are shown in Table 5 below.

TABLE 5

Flame Retardant Properties of Polyurethane Foams

| | Weight Loss in Foam (g) | | |
|---|---|---|---|
| Sample | Top-part | Middle-part | Bottom-part |
| 8 | 33.3 | 15.7 | 43.8 |
| 9 | 30.1 | 31.6 | 33.8 |
| 10 | 43.3 | 41.4 | 34.6 |
| 11 | 33.7 | 34.0 | 34.3 |

Table 5 illustrates that Samples with ethoxylated alcohols (samples 9 and 11) have more homogenous flame retardant properties across the foam.

Example 5

Physical Properties of Polyurethane Foams Made with and without Ethoxylated Alcohols Physical properties of Samples 8 and 9 of Example 4 were measured and presented in Table 6.

TABLE 6

Physical Properties of Polyurethane Samples 1 and 2

| Samples | RT (s) | Recession (%) | Density (kg/m$^3$) | Airflow (cm$^3$/cm$^2$/s) | Hardness 25% ILD (N) | Hardness 65% ILD (N) |
|---|---|---|---|---|---|---|
| 8 | 120 | 0.5 | 33.3 | 7.1 | 207 | 376 |
| 9 | 121 | 0.1 | 33.9 | 4.3 | 212 | 387 |

RT was the time that foam rise was complete. Recession, density, airflow, ILD hardness at 25% and 65% of indentations in the foam samples were determined according to ASTM3547.

Foam-rising profiles of samples 8 and 9 were measured and shown in FIG. 1.

The data in Table 6 and FIG. 1 indicates that the inclusion of ethoxylated alcohol of the invention does not affect foaming kinetics. It also does not adversely affect the physical properties of the resulted polyurethane foams.

While the invention has been described with reference to the above Examples, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:
1. A dispersion obtained by
contacting: at least one polyol,
melamine particles, and at least one ethoxylated alcohol of the following formula:

wherein R is a C1-C31 linear alkyl group,
n is an integer equal to or greater than 18;
wherein the at least one ethoxylated alcohol has a hydrophilic-lipophilic balance (HLB) value of equal to or greater than about 15.7; and
wherein the at least one ethoxylated alcohol is present in an amount of about 0.5 to 2.0 parts by weight per hundred weight parts of the at least one polyol of the dispersion.

2. The dispersion of claim 1, wherein the at least one ethoxylated alcohol is present in an amount effective for keeping said dispersion stable for at least 24 hours.

3. The dispersion of claim 1, wherein the at least one polyol is selected from the group consisting of polyether polyols, polyester polyols, or polymer polyols.

4. The dispersion of claim 1, wherein the at least one ethoxylated alcohol has a hydrophilic-lipophilic balance (HLB) value between 15.7 and 17.0.

5. The dispersion of claim 1, wherein the at least one ethoxylated alcohol is in an aqueous solution.

6. The dispersion of claim 1, wherein melamine particles are present in an amount of about 5 to about 80 parts by weight per hundred weight parts of the at least one polyol of the dispersion.

7. The dispersion of claim 1, wherein melamine particles are present in an amount of about 30 to about 80 parts by weight per hundred weight parts of the at least one polyol of the dispersion.

8. The dispersion of claim 1, further comprising fillers including $CaCO_3$, $BaSO_4$ or any combination thereof.

9. The dispersion of claim 1, further comprising a liquid flame retardant selected from the group consisting of halogenated flame retardants, non-halogenated flame retardants and any combination thereof.

10. The dispersion of claim 1, wherein the dispersion is substantially free of thickening agents.

11. The dispersion of claim 1, wherein the dispersion is substantially free of thickening agents selected from the group consisting of xanthan gums, carrageenans, polyacrylamide, chemically treated cellulose, clays and any combination thereof.

12. A dispersion consisting essentially of:
at least one polyol,
melamine, and
at least one ethoxylated alcohol of the following formula:

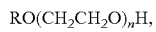

wherein R is a C13 linear alkyl group and n is 40,
wherein melamine is present in an amount of about 30 to about 80 parts by weight per hundred weight parts of the at least one polyol of the dispersion,
wherein the at least one ethoxylated alcohol is present in an amount of about 0.7 to 2.0 parts by weight per hundred weight parts of the at least one polyol of the dispersion.

13. The dispersion of claim 12, wherein the at least one ethoxylated alcohol is present in an amount effective for keeping said dispersion stable for at least 24 hours.

14. The dispersion of claim 12, wherein the at least one ethoxylated alcohol is in an aqueous solution.

15. A method for making a dispersion, comprising:
a) combining to form a mixture at least one polyol, melamine particles and at least one ethoxylated alcohol of the following formula:

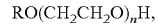

wherein R is a C1-C31 linear alkyl group,
n is an integer equal to or greater than 18,
wherein melamine particles are present in an amount of greater than 0 to about 80 parts by weight per hundred weight parts of the at least one polyol of the dispersion,
wherein the at least one ethoxylated alcohol is in an aqueous solution, is present in an amount of about 0.7 to 2.0 parts by weight per hundred weight parts of the at least one polyol of the dispersion, is effective for keeping said dispersion stable for at least 24 hours, and has a hydrophilic-lipophilic balance (HLB) value of equal to or greater than about 15.7; and
b) mixing the mixture of a) until a stable dispersion is formed.

16. A polyurethane foam formulation comprising
a) the dispersion of claim 1,
b) at least one polyisocyanate,
c) at least one blowing agent,
d) at least one amine catalyst,
e) at least one metal catalyst; and
f) at least one silicone surfactant.

17. A method for preparing a polyurethane foam comprising
a) forming a premix comprising
i) the dispersion of claim 1,
ii) at least one blowing agent,
iii) at least one amine catalyst,
iv) at least one metal catalyst,
v) at least one silicone surfactant; and
b) contacting the premix with at least one polyisocyanate at an isocyanate index from about 80 to about 150.

18. A polyurethane foam made with the polyurethane foam formulation of claim 16.

19. The dispersion of claim 12, wherein the at least one ethoxylated alcohol has a hydrophilic-lipophilic balance (HLB) value between 15.7 and 17.0.

20. The method of claim 15, wherein the at least one ethoxylated alcohol has a hydrophilic-lipophilic balance (HLB) value between 15.7 and 17.0.

21. The dispersion of claim 1, wherein n is an integer of 18 to 20.

* * * * *